United States Patent [19]

Wallentowitz et al.

[11] Patent Number: 4,938,330
[45] Date of Patent: Jul. 3, 1990

[54] FLUID-FRICTION CLUTCH WITH A COMPENSATING CHAMBER FOR VISCOUS FLUID

[75] Inventors: Henning Wallentowitz, Buch am Erlbach; Karl-Heinz Büchle, Sachsenheim; Bernd Hirschmiller, Stuttgart, all of Fed. Rep. of Germany

[73] Assignee: Daimler-Benz AG, Fed. Rep. of Germany

[21] Appl. No.: 354,213

[22] Filed: May 19, 1989

[30] Foreign Application Priority Data

May 19, 1988 [DE] Fed. Rep. of Germany ....... 3817082

[51] Int. Cl.$^5$ .............................................. F16D 35/00
[52] U.S. Cl. ................. 192/58 C; 192/58 R; 192/106 F
[58] Field of Search ............ 192/58 C, 58 R, 57, 192/58 B, 85 AA, 106 R, 112, 106 F; 74/650

[56] References Cited

U.S. PATENT DOCUMENTS

| 923,565 | 6/1909 | Newcomb | 192/58 B |
| 3,011,607 | 12/1961 | Englander | 192/58 C |
| 3,319,754 | 5/1967 | Kokochak et al. | 192/58 C X |
| 3,380,565 | 4/1968 | Wilkinson | 192/58 B |
| 3,396,605 | 8/1968 | Wilkinson et al. | 74/650 |

FOREIGN PATENT DOCUMENTS

| 3529234 | 3/1986 | Fed. Rep. of Germany |
| 3539484 | 12/1986 | Fed. Rep. of Germany |
| 3701884 | 12/1987 | Fed. Rep. of Germany |
| 0163040 | 7/1988 | Japan ................. 192/57 |

Primary Examiner—Rodney H. Bonck
Attorney, Agent, or Firm—Evenson, Wands, Edwards, Lenahan & McKeown

[57] ABSTRACT

In a fluid-friction clutch with a disc stack actuable by an adjusting piston and having resilient spacer parts, the viscous fluid escapes from the shearing gaps between adjacent discs of the stack into a compensating chamber located radially on the outside in relation to the disc stack, in order to ensure a completely torque-free lifting position of the clutch when the adjusting piston is not actuated.

10 Claims, 1 Drawing Sheet

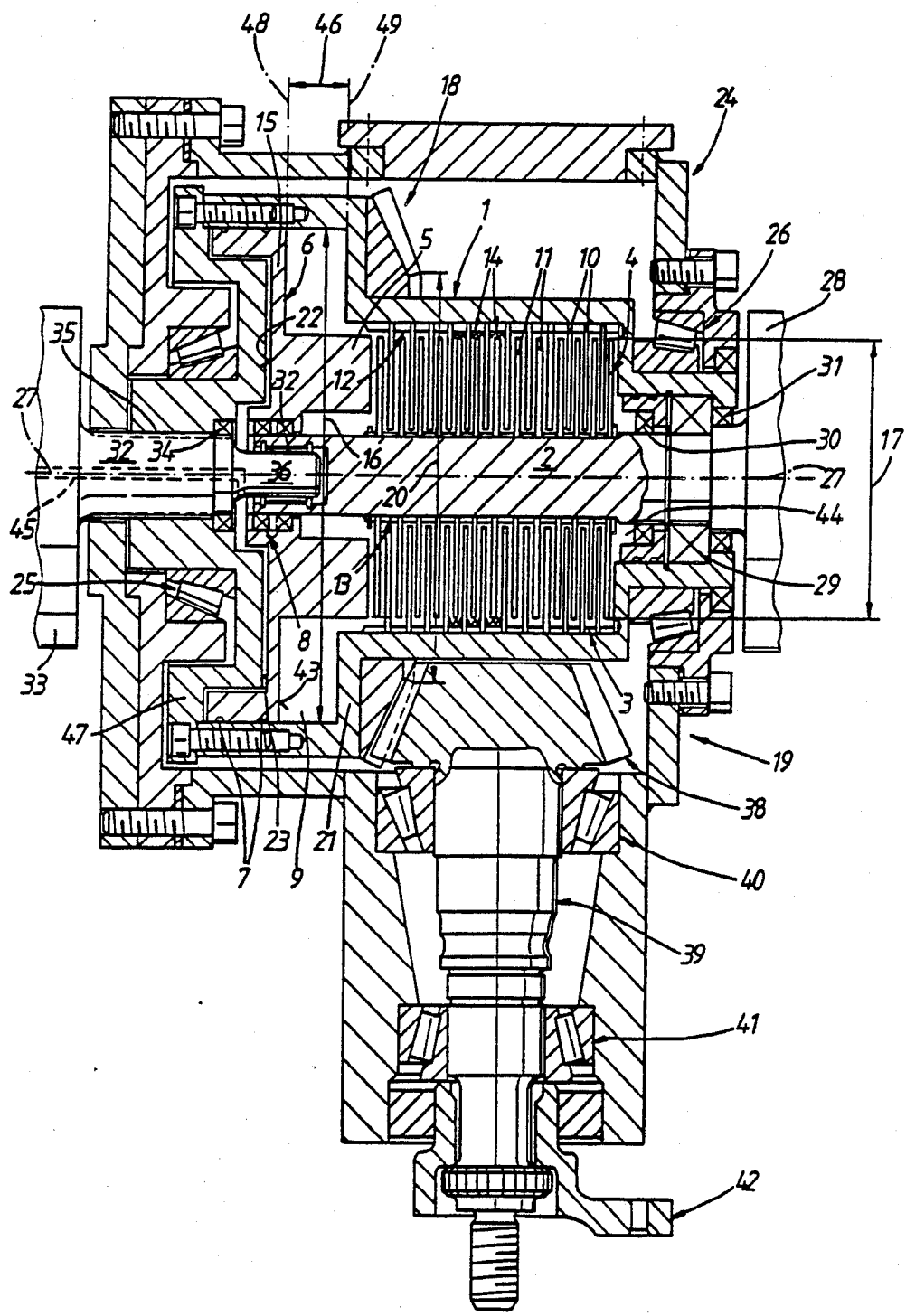

FLUID-FRICTION CLUTCH WITH A COMPENSATING CHAMBER FOR VISCOUS FLUID

BACKGROUND AND SUMMARY OF THE INVENTION

The present invention qenerally relates to a fluid-friction clutch and more particularly to a fluid-friction clutch in which the clutch torque can be varied.

In a fluid-friction clutch disclosed by German Patent Specification 3,529,234, the diametral dimensions of the clutch chamber, compensating chamber and adjusting piston are identical, so that the clutch chamber and compensating chamber are located on the same mid-radius relative to the clutch axis. Consequently, the friction discs are wetted by fluid because a fluid ring forms on the inner cylindrical surface of the entire clutch chamber under the effect of the centrifugal force. This wetting of the friction discs is accomplished even in the lifting Position of the adjusting piston, although the enclosed shearing gaps are then widened. Although the compensating chamber of the above-noted fluid-friction clutch is located on both end sides of the adjusting piston having axial Passages for this purpose, this design is nevertheless only adopted in order to make the clutch torque independent of pressure changes in the fluid as a result of the positive-displacement effect of the adjusting piston.

German Pat. Specification No. 3,539,484 discloses a fluid-friction clutch in which the clutch housing is not closed on all sides, but has an orifice. The orifice is provided in order to form two differential-pressure surfaces of equal size which act oppositely to one another on the adjusting piston which acts on the disc stack via a thrust ring. One differential-pressure surface is subjected to atmospheric pressure via the orifice with the assistance of a thrust spring and acts with the effect of widening the shearing gaps. The other differential-pressure surface located on the end face of the adjusting piston opposite the disc stack is subjected to the pressure of the viscous fluid via axial piston ducts. At an increased working temperature of the viscous fluid, this other differential-pressure surface actuates the disc stack to a block, thereby generating a mechanical friction state, so that the clutch slip becomes zero and the working temperature falls again to admissible operating values.

To form the differential-pressure surfaces, the disc carrier of the clutch housing rests against the inner surface of a sleeve-shaped housing insert which is arranged concentrically within the clutch housing and which is retained on the adjacent housing wall of the clutch housing fixedly in terms of thrust and movement by one end face. The adjusting piston, guided by a first sliding-gasket arrangement on the inner surface of the housing insert, passes through the open other end face of the housing insert, and at its piston end located outside the latter, has a piston part of widened diameter which is guided on the cylindrical inner surface of the clutch housing by a second sliding-gasket arrangement. The two inner surfaces interacting with the sliding-gasket arrangement limit the two differential-pressure surfaces.

In another fluid-friction clutch disclosed by German Pat. Specification No. 3,701,884, neither an emptying of the clutch chamber in the disconnected state nor resilient spacer parts are provided, so that in the disconnected state there always arises a fluid-friction moment which depends on the atmospheric pressure because of a thereby open connection between the clutch chamber and the atmosphere. Located in this open connection to the atmosphere is a working-pressure chamber which is constantly open to the clutch chamber and is provided in the shaft and which belongs to a displacement piston which, during its compression stroke, causes an increase of pressure in the clutch chamber by closing the respective orifice to the atmosphere, so that it is possible to increase the clutch torque up to the mechanical frictional connection of the clutch discs.

An object of the present invention is to provide a fluid-friction clutch with a disc stack and with an adjusting piston for varying shearing gaps between discs of the stack, in which the clutch torque can be varied by the position of the adjusting piston and becomes completely zero in a non-actuated lifting position of the adjusting piston.

In the fluid-friction clutch according to certain preferred embodiments of the present invention, during a lifting stroke of the adjusting piston, the viscous fluid escapes from the disc stack into a compensating chamber expanded by the movement of the adjusting piston and collects radially outside the disc stack due to the effect of the centrifugal force. As a result, the shearing surfaces of the discs are no longer reliably wetted by the viscous fluid and the clutch torque therefore becomes zero.

Such a fluid-friction clutch is consequently ABS-compatible, i.e., suitable for use as a transverse or longitudinal differential in a vehicle with four-wheel drive and automatic anti-lock control.

In certain preferred embodiments of the clutch according to the invention, the disc spacing and the filling ratio of the clutch chamber are varied. This can be obtained by a hydraulic connection, via which pressure oil is conveyed to the adjusting piston of the fluid-friction clutch. The adjusting piston, by being subjected to pressure oil, ensures that the discs are pushed together. At the same time, the filling ratio of the clutch is changed because oil is displaced out of the compensating chamber and into a working chamber of the disc stack. This compensating chamber can include pockets which are located in the clutch housing.

If a fluid-friction clutch of highly variable characteristics is designed so that, without any additional oil pressure, there is no wetting of the discs with silicone oil at all, a freewheeling can be obtained with the fluid-friction clutch according to certain preferred embodiments of the invention. With an increasing feed of pressure oil, silicone oil is forced between the discs and (depending on the design of the fluid-friction clutch) the discs are moved towards one another, that is to say there is both an increase in filling and a decrease in the spacing. These operative mechanisms occur simultaneously and cause an increase in the transmissible torque in this fluid-friction clutch.

The fluid-friction clutch according to certain preferred embodiments of the invention can be used as a cut-in clutch for a driving axle of a motor vehicle with four-wheel drive. Furthermore, the fluid-friction clutch according to preferred embodiments of the invention can replace an axle differential if it is regulated by electronics in such a way that the transmitted torque corresponds to the driving state.

The disconnection of the fluid-friction clutch according to preferred embodiments of the invention when the oil pressure is cancelled takes place via the effect of the centrifugal force, and furthermore small cup springs are arranged between the discs. In this arrangement these cup springs are preferably located between two identical discs.

Other objects, advantages and novel features of the present invention will become apparent from the following detailed description of the invention when considered in conjunction with the accompanying drawings.

BRIEF DESCRIPTION OF THE DRAWING

The single figure of the Present application illustrates an exemplary embodiment of a fluid-friction clutch according to the teachings of the present invention.

DETAILED DESCRIPTION OF THE DRAWING

In an axle transmission case 24 of an axle drive 19, which can be used for driving a vehicle axle of a motor vehicle, an annular clutch housing 1 of a fluid-friction clutch is mounted centrally and rotatably relative to a geometrical clutch axis 27—27 by two rolling-bearing arrangements 25 and 26. Arranged centrally relative to the clutch housing 1 is a central shaft 2 which passes axially outwards through the clutch housing 1 and which, at its outer end, has a connecting flange 28 for the articulation of a driving half-shaft which drives a vehicle wheel. The shaft 2 is mounted rotatably relative to the clutch housing 1 by a rolling-bearing arrangement 29 and is sealed off respectively by an axially inner and an axially outer gasket arrangement 30 and 31.

On the end face associated with the rolling bearing 25, the clutch housing 1 has a central shaft stub 32 passing outwards through it which, at its outer shaft end, has a connecting flange 33 for the articulation of a driving half-shaft for driving a vehicle wheel. The shaft stub 32 sealed off from the clutch housing 1 by a gasket arrangement 34 and supported fixedly in terms of rotation by a splining 35 has, at its inner end in relation to the housing, a trunnion 36 on which is supported the end of the shaft 2 on the inside relative to the housing by a needle bearing 37.

An annular ring wheel 18 is arranged concentrically and fixedly in terms of movement relative to the clutch housing 1, and is supported on a radial housing wall 21 of the housing. The ring wheel 18 meshes in the customary way with a drive pinion 38. The pinion shaft 39 of the drive pinion 38 is supported in the axial transmission case 24 by two rolling-bearing arrangements 40 and 41 and, at its outer shaft end in relation to the housing, has a connecting flange 42 for the articulation of a driveshaft train extending in a known way from a power divider.

Enclosed concentrically by the annular clutch housing 1 and the shaft 2 is an annular clutch chamber 3 which is closed sealingly on all sides for receiving a viscous fluid. A disc stack 4, axially thereafter a thrust ring 5 and an annular adjusting pinion 6 are received in the clutch chamber 3. The disc stack 4 comprises discs 10 which, at their radially outer ends, engage fixedly in terms of rotation and axially displacement, a disc carrier 12 formed on the inner periphery of the clutch housing 1 fixedly in terms of movement relative to housing 1. The disc stack 4 also includes discs 11 which are each arranged between two discs 10 and which, at their radially inner ends, engage fixedly in terms of rotation and axially displacement into a disc carrier 13 formed on the outer periphery of the shaft 2 fixedly in terms of movement relative to the shaft.

The adjusting piston 6, designed in one piece with the thrust ring 5, is guided sealingly and axiallY displaceably relative to a widened portion of the inner surface of the clutch housing 1 via a radially outer annular sliding-gasket arrangement 7 and relative to an end portion of the outer surface of the shaft 2 via a radially inner annular sliding-gasket arrangement 8. The adjusting piston 6 and that part of the clutch chamber 3 receiving the piston 6 have an outside diameter 16 which is substantially larger than the outside diameter 17 of the discs 11 retained on the shaft 2.

The adjusting piston 6 has no axial passages between its end faces, that is to say its piston cross-section 15, extending between the sliding-gasket arrangements 7 and 8, is closed on itself. The clutch chamber 3 is thereby sub-divided by the adjusting piston 6 on the one hand into a working chamber 44 containing the disc stack 4 and a compensating chamber communicating constantly with the working chamber 44 containing the disc stack 4 the two chambers being limited by the adjacent piston end face 43 of the adjusting piston 6. On the other hand, the chamber 3 is divided by the piston 6 into an auxiliary-pressure chamber 23 limited by the other piston end face 22 of the adjusting piston 6. The auxiliary-pressure chamber 23 can be subjected to an auxiliary pressure via a pressure-chamber connection 45 in the shaft stub 32. The compensating chamber 9 and ring wheel 18 are axially directly adjacent to the housing wall 21 on both sides, the compensating chamber 9 also being arranged relative to the clutch axis 27—27 in such a way that its outside diameter is larger than the small cone diameter 20 of the ring wheel 18.

A resilient spacer body in the form of a cup spring 14 is arranged in the respective annular space located axially between two discs 10 and limited radially by the respective intermediate disc 11 and the disc carrier 12. The actuating stroke 46 of the adjusting piston 6 is limited by a stroke end position 48, in which the adjusting piston 6 rests against that housing end wall 47 of the clutch housing 1 associated with the rolling bearing 25, and by a stroke end position 49, in which the adjusting piston 6 rests against the housing wall 21. The actuating stroke 46 of the adjusting piston 6 is so coordinated with the total lifting play of the discs 10 generated by the cup springs 14, that in the stroke end position 49 adjacent the innermost disc of disc 11, thrust ring 5 acts directly on the disc stack 4 and together with the cup springs 14 makes it possible to reduce the shear gap between adjacent discs 10, 11. Although the shearing gaps for the viscous fluid, which are enclosed between the discs 10 of the clutch housing 1 and the discs 11 of the shaft 2, are brought to a minimum by the operation of the thrust ring 5; a mechanical frictional connection caused when discs 10 and discs 11 rest directly against one another is reliably prevented.

Furthermore, allowing for the dead volume of the thrust ring 5, the volume of the annular compensating chamber 9 enclosed between the clutch housing 1 and shaft 2 is coordinated with the total volume of the shearing gaps in the working chamber 44 so that, in the stroke end position 48, the viscous fluid escapes from the working chamber 44 as a result of the suction effect occurring during the lifting stroke. As a result of the effect of the centrifugal force, the viscous fluid collects radially on the outside in the compensating chamber 9, with the result that a wetting of the discs 10 and 11 in the stroke end position 48 is reliably prevented and the clutch torque is therefore zero.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Fluid-friction clutch having an annular, rotatable clutch housing enclosing a rotatable central shaft comprising:
   a clutch chamber enclosed concentrically between the annular clutch housing and the central shaft, the clutch chamber being closed on all sides for receiving a viscous fluid;
   a disc stack, having discs adjacent a thrust ring and an axially displaceable adjusting piston, each arranged in the clutch chamber; and
   a compensation chamber in constant communication with the clutch chamber and located between the disc stack and the adjusting piston for receiving the viscous fluid of the clutch chamber, the adjusting piston being movable within the compensation chamber between first and second lifting stroke positions to vary a volume of the compensation chamber and the volume of the compensation chamber being coordinated with a total volume of a plurality of shear gaps formed between adjacent discs of the stack so that when the adjusting piston is moved to one of the first and second lifting stroke positions, viscous fluid drains from between the plurality of shear gaps into the compensation chamber and a viscous coupling of the discs is prevented, a clutch torque of the clutch becoming zero.

2. Fluid-friction clutch according to claim 1, further comprising outer and inner sliding sealing means for sealing of the adjusting piston from the clutch housing and from the central shaft, respectively.

3. Fluid-friction clutch according to claim 2, wherein the clutch housing and central shaft each have a disc carrier retaining discs of the disc stack, each disc retaining the discs against rotation relative to a respective carrier thereof.

4. Fluid-friction clutch according to claim 3, wherein resilient spacer means are arranged on at least one disc carrier between discs of the disc stack.

5. Fluid-friction clutch according to claim 4, wherein a closed sealing surface is formed by a surface of the adjusting piston between the outer and inner sliding sealing means.

6. Fluid-friction clutch according to claim 5, wherein the compensation chamber has an outside diameter greater than an outside diameter of the discs retained by the disc carrier of the shaft.

7. Fluid-friction clutch according to claim 6, wherein the thrust ring is arranged fixedly relative to the adjusting piston in terms of thrust and movement and that a part of the compensating chamber located radially on an outside relative to the trust ring has a larger part volume than a remaining part of the compensation chamber.

8. Fluid-friction clutch according to claim 6, wherein a ring wheel of an axle drive is arranged concentrically on an outside of the clutch chamber and fixedly in terms of movement relative to the clutch housing, and the outside diameter of the compensating chamber is larger than a diameter of the ring wheel.

9. Fluid-friction clutch according to claim 8, wherein the compensating chamber and ring wheel are arranged on opposite sides of a radial housing wall of the clutch housing.

10. Fluid-friction clutch according to claim 6, wherein a chamber part of the clutch chamber which is sealed off from the compensating chamber by the inner and outer sealing means and which is enclosed by a piston end face of the adjusting piston located opposite the disc stack and limited radially by the inner and outer sealing means can be put under an auxiliary pressure to axially move the adjusting piston.

* * * * *